INVENTORS
FRANK J. POKORNY
CHARLES J. YARRICK
BY
OSTROLENK, FABER, GERB & SOFFEN
ATTORNEYS

May 5, 1970  F. J. POKORNY ET AL  3,510,811
ANTISINGLE PHASE DEVICE

Filed July 21, 1967  2 Sheets-Sheet 2

INVENTORS
FRANK J. POKORNY
CHARLES J. YARRICK
BY

OSTROLENK, FABER, GERB & SOFFEN
ATTORNEYS

United States Patent Office 3,510,811
Patented May 5, 1970

3,510,811
ANTISINGLE PHASE DEVICE
Frank J. Pokorny, Hatboro, Pa., and Charles J. Yarrick, Haddonfield, N.J., assignors, by mesne assignments, to I-T-E Imperial Corporation, Philadelphia, Pa., a corporation of Delaware
Filed July 21, 1967, Ser. No. 655,170
Int. Cl. H01h 51/06
U.S. Cl. 335—142         13 Claims

ABSTRACT OF THE DISCLOSURE

An antisingle phase device including a plurality of energized electromagnets connected in electrical parallel with a plurality of fuses, each one of which is in electrical series with one of the plurality of pairs of cooperating contacts of a circuit breaker. When any one of the series connected fuses experiences current flow above a predetermined magnitude, such fuse will blow and the voltage thereacross will be applied to the parallel connected electromagnetic structure associated therewith to attract a common armature toward the electromagnet, which, in turn, causes the tripping or opening of all of the contact pairs of the circuit breaker.

---

This invention relates to circuit breakers having fuses in series therewith and more particularly relates to an antisingle phase device which brings about the opening of all contacts of the circuit breaker in response to circuit interruption in any phase of the breaker caused by the operation of the fuse located therein.

It is well known in the art to incorporate circuit breakers in a power transmission system in order to protect the system from faults occurring therein. For adequate protection, a circuit breaker must be chosen which has an interrupting capacity equal to the maximum available short circuit current of the system to be protected. It is possible, however, to utilize circuit breakers having an interrupting capacity below the magnitude of the maximum available short circuit current of the system by placing a fuse in series with the breaker. In this manner when overload conditions have persisted for a predetermined time and/or instantaneous fault currents are experienced below a predetermined magnitude, a time delay and/or instantaneous tripping means of the circuit breaker per se is operable to trip the circuit breaker contacts to their open circuit condition. However, upon the appearance of a short circuit fault current above the predetermined magnitude, the fuse will operate (blow) to protect both the lower rated circuit breaker tripping elements as well as the load being serviced by the breaker.

Similarly, it is known to utilize series connected fuses in combination with nonautomatic circuit breakers, that is, circuit breakers without automatic tripping devices. When used without an overcurrent feature, combinations of nonautomatic circuit breakers and fuses are called Service Entrance Protectors. In this case the overload or short circuit current causes "blowing" of the fuse if the current persists longer than a predetermined time.

When multiphase circuit breakers are being utilized (one pair of cooperating contacts for each phase) certain problems are encountered when the basic circuit breaker is supplemented by the addition of fuses in electrical series therewith. If means are not provided, it is possible for two phases of a three-phase circuit breaker to be conducting current while a third phase is not conducting current because the fuse therein had blown. This situation is called single phasing and can be extremely injurious to the entire transmission system.

The prior art has suggested several ways of preventing single phasing. Thus, as illustrated in U.S. Pat. 3,171,926 issued Mar. 2, 1965 to J. F. Schwab, entitled, "Circuit Breaker Having a First Plurality of Series Connected Fuses and a Second Plurality of Fuses in Parallel Therewith," and assigned to the assignee of the instant invention, there is shown a multiphase circuit breaker having a plurality of current limiting fuses in series therewith. In parallel with each of the current limiting fuses is a second fuse including a striker pin which is released whenever the second fuse is blown. Additionally, a linkage arrangement is provided to initiate the opening of all contact pairs of the breaker when the striker pin of any one of the second fuses is released. As explained in greater detail in the Schwab patent, the occurrence of a short circuit fault in any phase of the breaker causes the current limiting fuse in series therewith to blow which, in turn, causes the current flow to be diverted through the striker-bearing fuse in parallel therewith. Such parallel connected fuse is then blown to release the striker pin which, in turn, initiates contact separation in all phases of the breaker.

The above described arrangement prevents single phasing in that all contact pairs of the circuit breaker are opened in response to the blowing of one series connected fuse, but has an inherent drawback. That is, each time the striker-bearing parallel connected fuse is blown to initiate the antisingle phase protection such striker-bearing fuse must be replaced.

Other methods of preventing single phasing have utilized electromagnetic coils in parallel with the series connected fuses such that when any one of the fuses is blown during a short circuit condition in the repective phase, the electromagnetic coil in parallel therewith is energized to attract an independent armature associated therewith. Independence movement of any one of the armatures causes latch release of the energy stored in a spring and this ultimately initiates contact separation in all phases of the circuit breaker. Again, this arrangement solves the problem of single phasing, but because of the use of a plurality of independent armatures results in a rather complex structure which materially adds to the bulk and cost of the antisingle phase unit.

Furthermore, when a short circuit fault has occurred in one phase of a multiphase system, it is common that a similar fault will occur in other phases such that more than one series fuse will be blown. In this situation, and because of the gravity of the problem, it is desirable that the antisingle phase protection operate even quicker than usual in order to protect the remaining phase or phases of the system where a fault has not been experienced. However, in both prior art systems described above, the independent nature of the striker-bearing parallel fuses, or the independent action of the individual armatures will not hasten operation of antisingle phase devices in the situation where two series fuses have blown. That is, the first parallel fuse blown in the Schwab patent initiates the tripping of the circuit breaker contacts, and the fact that a second parallel fuse has blown to release its striker pin immediately thereafter has no affect on the system and will not speed up the opening of the breaker contacts. Similarly, in an antisingle phase device having a plurality of independent electromagnetic coils and armatures, the movement of the first armature, in response to the operation of a series connected fuse, initiates contact separation, and the fact that a second coil has been energized to attract its armature in no way speeds up the opening of the breaker contacts.

In contradistinction to the prior art, the instant invention provides an antisingle phase device which includes a plurality of electromagnets each connected in electrical parallel with the fuses which are in series with the circuit breaker contacts. According to the invention, a common armature cooperates with the plurality of electromagnets such that when any one of the electromagnets is energized in response to the operation of the fuse in parallel therewith, the single common armature is drawn toward the energized electromagnet to cause the trip bar of the circuit breaker to be moved which, in turn, initiates contact separation in all phases of the breaker. In this manner single phasing is prevented while at the same time the structure provided for that purpose is of the utmost simplicity.

Furthermore, and in accordance with the instant invention, it will be appreciated that in the event there is a fault occurring in more than one phase of the multiphase system, such that a plurality of series connected fuses interrupt, voltage will be applied to the corresponding number of electromagnets connected in parallel therewith. Because the instant invention utilizes a common armature means cooperating with all of the parallel connected electromagnets, in the situation where more than one electromagnet is energized, the common armature will see a buildup of electromagnetic flux (generated by two electromagnets, for example) which will materially quicken the movement of the armature toward its attracted position with respect to electromagnets. In this manner the operation of the antisingle phase device of the instant invention, to initiate contact separation in the main circuit breaker, will be quicker than in the event only a single electromagnet were energized and quicker than the prior art systems described above. That is to say, in accordance with the instant invention the effects of a plurality of energized electromagnets are cumulative rather than independent as in the prior art such that the instant invention is faster acting in the situation where there has been fault in more than one phase of the system.

As a particularly advantageous feature of the instant invention, one leg of a tray which physically supports the plurality of electromagnets further functions as a portion of the magnetic flux path for all of the electromagnets. This construction is to be contrasted with prior art antisingle phase devices utilizing electromagnets where complete magnetic cores and armatures are provided for each electromagnet thereby increasing cost, size, weight and complexity of design.

As another particularly advantageous feature of the instant invention, a pivotally mounted striker is rotatable between a first and second position to rotate a trip bar of the breaker and initiate contact separation in response to movement of the common armature means of the antisingle phase device of the instant invention between its first and second position. Actually, the striker is held in its first position by a target member which is latched and held in place by the common armature means when the common armature means is in its first, nonattracted position. In accordance with the invention, biasing means in the form of an extended spring is mounted so that the force of the spring is close to the pivotal mounting of the striker member such that a minimal force is normally applied to the striker when it is latched in its first position by the target member. Thus only a minimum amount of energization of one of the parallel connected electromagnets is required to draw the common armature means toward its attracted position such as to unlatch the target member and permit the extended spring to begin the rotation of the striker from its first toward its tripping position. However, as the striker is rotated the line of force of this extended spring passes well beyond the normal "close to center" position such that the force causing rotation of the striker is greatly increased as it approaches its second, tripping position whereby the striker will strike the tripper bar of the breaker to initiate contact separation.

As a further feature of the instant invention, the target member which functions to latch the striker in its first position when the common armature means of the antisingle phase device is in its normal, nonattracted position, also functions to provide a visual indication of the status of the antisingle phase device. Thus the target member includes an indicator portion which moves from a normally concealed position to an extended position outside the confines of the antisingle phase device when the striker has rotated sufficiently to trip the circuit breaker. Accordingly, protrusion of the extended portion of the target member is a visual indication of operation of the antisingle phase device.

As a further feature of the instant invention, it will be appreciated by those skilled in the art that the instant invention, although especialy applicable to an antisingle phase device for a multiphase circuit breaker, is not necessarily limited to such environment. Rather, it should be clear that the instant invention will find application in any situation where it is desirable to monitor, by electromagnetcs, a plurality of conductors, and produce an output motion in response to the occurrence of predetermined conditions occurring in any one or more of the csonductors. It should be further apparent that, because of the additive effect of the flux generated by more than one electromagnet (made possible by the use of a common armature), the instant invention would be particularly useful, in monitoring situations, where the occurrence of predetermined conditions takes place in more than one of the conductors.

Accordingly, it is an object of the instant invention to provide an antisingle phase device which includes a plurality of electromagnets each connected in electrical parallel with a fuse connected in series with one phase of a multiphase circuit breaker, with such antisingle phase device including a common armature which is movable from a first position to a second position to trip the circuit breaker contacts in response to energization of any one of such electromagnets.

Another object of the instant invention is to provide such an antisingle phase device wherein the occurrence of a fault in more than a single phase of a multiphase system will cause cumulative magnetic flux to be generated in the antisingle phase device to materially hasten circuit interruption in all phases of the breaker.

Another object of the instant invention is to provide such an antisingle phase device which includes a striker member occupying a first nontripping position when the common armature of the device is in its first position and biased toward a second position by an extended spring which has a minimum effect when the striker is in its first position but which increases the force-causing-motion of the striker as it is moved toward its second position in response to a fault occuring in any phase of the distribution system.

Still another object of the instant invention is to provide such an antisingle phase device which includes a target member which performs a dual function of latching the striker in its first position when the common armature means is in its nonattracted position, and which further serves as a visual indicator of the status of the antisingle phase device.

Still another object of the instant invention is to provide such an antisingle phase device wherein a portion of the structure which physically supports the electromagnets thereof additionally functions as a portion of the magnetic flux path of the magnets.

These and other objects of the instant invention will be had when referring to the following description and drawings, in which.

Figure 1:
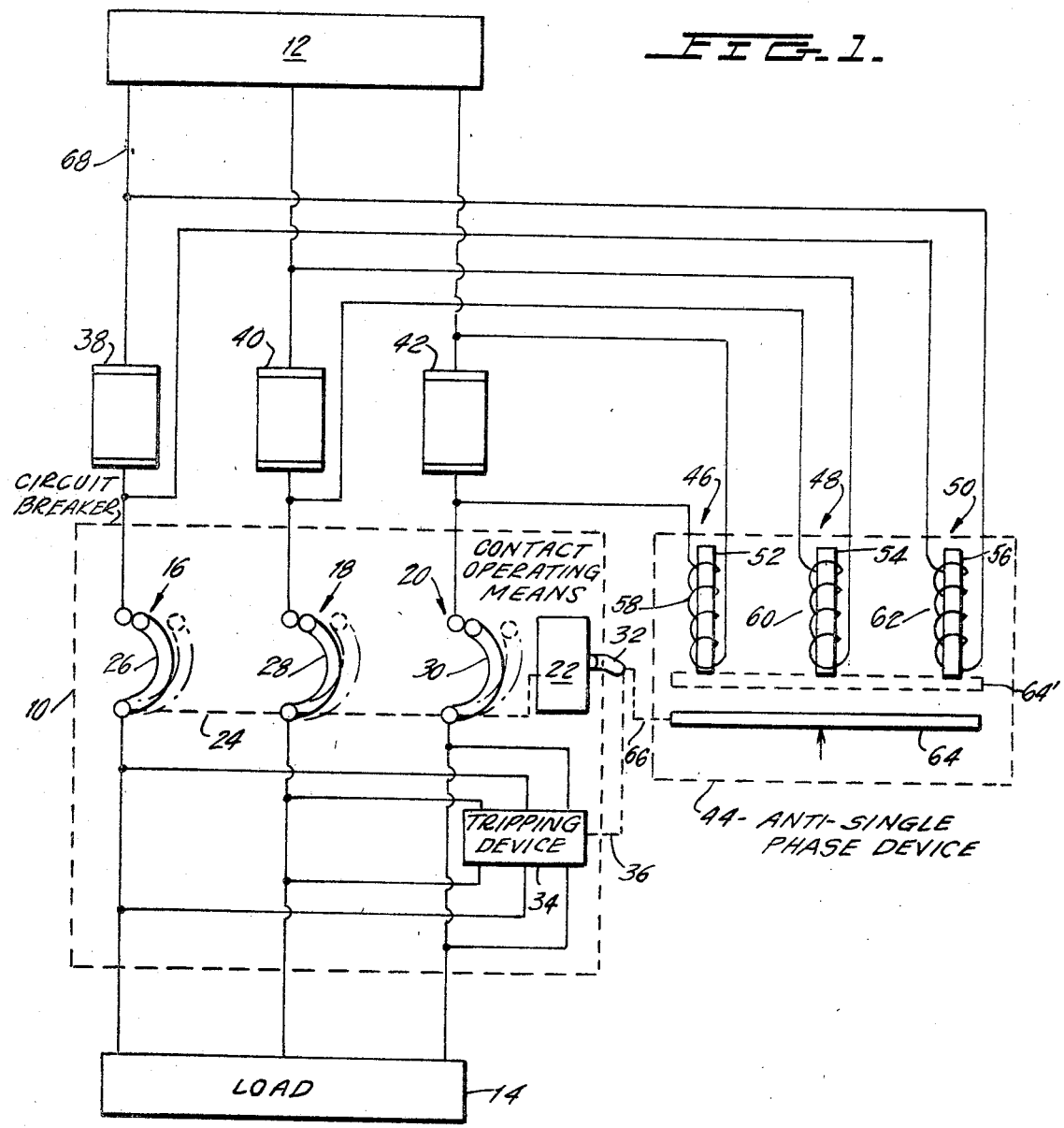
FIG. 1 is a schematic circuit diagram of the antisingle phase device of the instant invention utilized in combination with a circuit breaker having series fuses connected therewith.

Referring specifically to FIG. 1, there is shown in schematic form a multiphase circuit breaker 10 interposed between a multiphase source 12 and a load 14 to be protected by the breaker 10. As well known in the art, a multiphase circuit breaker includes a plurality of contact pairs 16, 18 and 20, corresponding to the number of phases of the system, which are operable from the closed circuit position shown in FIG. 1 to an open circuit position shown in phantom in FIG. 1 in response to actuation of a contact operating means schematically shown at 22. Although the antisingle phase device of the instant invention is in no way dependent upon or limited to a particular type of contact operating means, it may be pointed out that one type of contact operating means prevalent in the prior art consists of a plurality of charged springs which are discharged in response to rotation of the trip bar 32 to rotate a common shaft, schematically shown at 24, which, in turn, rotates the contact arms 26, 28, 30 to their open circuit position.

As noted previously, the circuit breaker 10 may be provided with an internal tripping device 34 which, in response to sensing a time delayed overload and/or an instantaneous fault, causes the rotation of the trip bar 32 (schematically illustrated by the phantom linkage 36) to initiate contact separation of the contact pairs 16, 18 and 20 via the contact operating means 22. Again, although not to be limited by such disclosure, it may be pointed out that typical prior art tripping devices include electromagnetic coils in parallel with the fuses they monitor which coils, upon the occurrence of predetermined fault conditions, attract associated armatures which, in turn, cause the rotation of the trip bar 32.

With the system thus far described, it may be appreciated that the circuit breaker 10, and particularly the tripping device 34, must be designed to accommodate the maximum short circuit fault condition which might occur within the system between the source 12 and the load 14. However, and as previously noted, it is possible to utilize a circuit breaker having a maximum rating below that of the maximum short current that may be experienced in the system, by adding series connected current limiting fuses such as shown at 38, 40 and 42 in FIG. 1. Thus when a fault is experienced in any of the phases of the breaker which is below a predetermined magnitude (within the rating of the circuit breaker and tripping device 34), the tripping device will sense the fault, cause the rotation of the trip bar 32 and initiate contact separation of all contact pairs 16, 18 and 20 by way of the discharge of contact operating means 22. However, when any phase of the system experiences a fault above a predetermined magnitude (above the rating of the circuit breaker and tripping device 34) the fuse in that phase where the fault is experienced will blow or interrupt to protect that phase.

However, it may be further appreciated that without the addition of the antisingle phase device 44, to be described immediately below, interruption of a single fuse such as 38 will not initiate operation of the contact operating means and will not cause the opening of the contact pairs 16, 18 and 20. Thus it is possible that although fuse 38 has interrupted the flow of current through one phase of the distribution system, it may very well be that the other two phases are conducting current thereby producing the injurious result known in the art as single phasing.

Broadly speaking, the antisingle phase device 44 of the instant invention includes a plurality of electromagnets 46, 48 and 50 each of which is in electrical parallel with respect to one of the fuses 38, 40 and 42. As shown, each of the electromagnets include an iron core 52, 54 and 56 about which are wrapped energizing coils 58, 60 and 62, respectively. A common armature 64 normally occupies a first position spaced away from the cores 52, 54 and 56 and is drawn into engagement with the cores (shown in phantom at 64') when any of the electromagnets 46, 48 or 50, or any combination thereof, is energized.

As will be explained in greater detail, movement of the common armature 64 toward its second, attracted position causes rotation of the trip bar 32 (schematically linked at 66) which, as described previously, initiates operation of the contact operating means 22 to open the contact pairs 16, 18 and 20.

Overall operation may be explained as follows. Assuming a fault bove a predetermined magnitude is experienced in phase 68, the fuse 38 will be blown such that the voltage appearing across the opened fuse will now be applied across the electromagnet 50 to energize same and draw the armature 64 from its first to its second position. Movement of the armature rotates the trip bar 32 to initiate contact separation of all the contact pairs via the contact operating means 22.

It may be appreciated, and in particular accordance with the instant invention, that because the armature 64 is a common armature (that is, it will be attracted to its second position 64' in response to energization of any electromagnet); in a situation where two electromagnets, such as 46 and 48 have been energized simultaneously or relatively close to one another, the armature 64 will experience double the magnetic flux which would otherwise occur if only one electromagnet were energized. Accordingly, in the situation where two fuses such as 38 and 40 have blown relatively close to one another in time both electromagnets 50 and 48 will be energized such as the magnetic flux on the armature 64 is cumulative (rather than independent as in the prior art) to hasten opening of the contact pairs 16, 18 and 20 in this very severe situation where two phases have experienced a fault.

Figure 2:
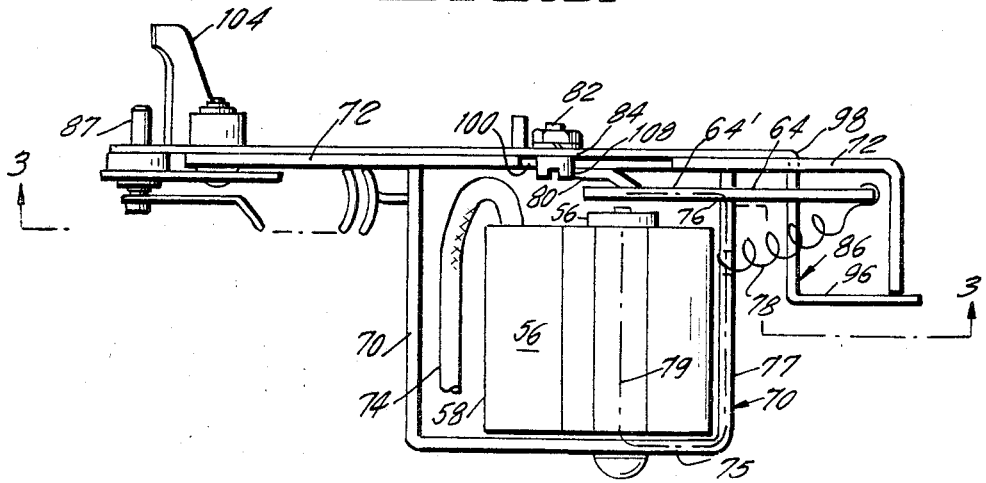
FIG. 2 is a plan view of the antisingle phase device of the instant invention.
Figure 3:
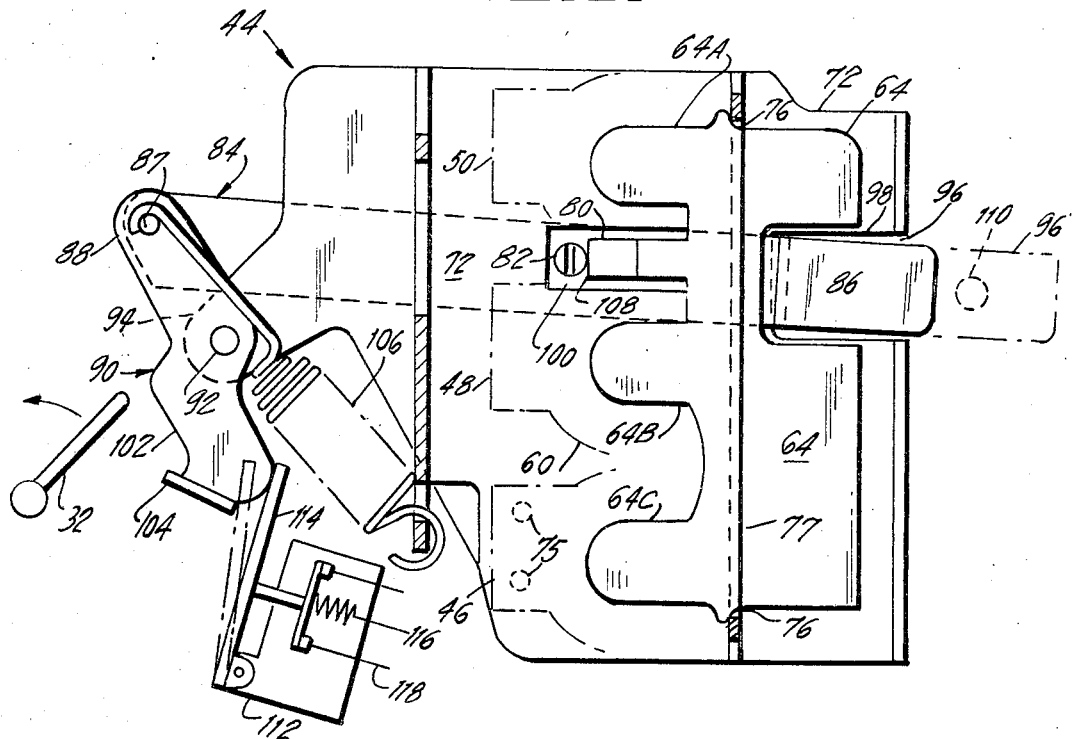
FIG. 3 is a side view of the antisingle phase device of FIG. 2, taken along the arrows 3—3 thereof.

Referring to FIG. 2 and 3, a detailed explanation of the preferred embodiment of the antisingle phase device 44 of the instant invention will now be presented. As best seen in FIG. 3, the antisingle phase device 44 includes a plurality of electromagnets 46, 48 and 50 (preferably shown as 3 for a three-phase system) supported as seen in FIG. 2 in a generally U-shaped tray 70 depending from a frame member 72. The coils 58, 60 and 62 (FIG. 1) surround the cores 52, 54 and 56, respectively, and are energized by the appropriate conductors such as 74 in FIG. 2.

As best seen in FIG. 3, the U-shaped support tray 70 extends for the entire width of the antisingle phase device 44 and in addition to physically supporting the electromagnets 46, 48 and 50, performs an additional function. Specifically, and as best illustrated in FIG. 2 for the electromagnet 50, a portion of the base leg 75 and a portion of the upstanding leg 77 of the tray 70 form a portion of the magnetic circuit path for the electromagnets. Thus it may be seen that the magnetic path for each of the electromagnets would include the core, such as 52 in FIG. 2, the portion 75 of the base leg of the tray, the portion of the upstanding leg 77, and a portion designated 64' of the common armature 64. The magnetic circuit path described is illustrated by the phantom lines designated 79 in FIG. 2. Furthermore, it is to be understood that for each of the other electromagnets, i.e., 48 and 46, a similar flux path is defined by the respective core thereof and the corresponding portions of the tray 70.

The common armature 64 resides in a slot 76 in one leg 77 of the U-shaped tray 70 and is biased clockwise in FIG. 2 toward a first position away from the electromagnets by a biasing spring 78. As best seen in FIG. 3, the common armature 64 is a generally planar E-shaped member having outstanding legs 64A, 64B and 64C which extend out over the respective cores 52, 54 and 56. Furthermore, disposed between the legs 64A and 64B is an upstanding tab or latch member 80 which, as seen in FIG. 2, is normally in blocking relationship with respect to a stud 82 inserted in and depending from a target member 84, the purpose of which will become apparent.

The target member 84 is a generally elongated member having an L-shaped indicating portion 86 at one end thereof and being pivotally secured by way of pin 87 at the opposite end thereof to one end 88 of a striker 90 which, in turn, is pivotally mounted at 92 on an extension 94 of the frame member 72. The target 84 is guided for movement by the leg 96 of the L-shaped indicating portion 86 being freely received within a slot 98 of the frame member 72. As best seen in FIG. 3, the frame member 72 includes an elongated cutout section 100 within which the depending stud 82 may travel when the target 84 is moving from left to right in FIG. 3, as will be further explained.

The striker 90 includes at its end 102 an upstanding wing 104 which functions, upon rotation of the striker 90, to rotate the trip bar 32 in a counterclockwise direction, as seen in FIG. 3, which, as explained previously, initiates contact separation of the breaker. Furthermore, it may be appreciated that biasing means in the form of an extended spring 106 is secured at one end to the frame 72 and at the other end to the pin 87 on end 88 of the striker member 90. Biasing means 106 tends to rotate the striker member 90 clockwise, as seen in FIG. 3. However, with the common armature 64 in the solid line position shown in FIG. 2, the upstanding tab 80 thereof is in engagement with the depending stud 82 to prevent movement of the target member 84 and thereby prevent clockwise rotation of the striker member 90 despite the force exerted by the spring 106. It should be further appreciated that when the striker 90 is in its first or solid line position, shown in FIG. 3, the force exerted by spring 106 is at a minimum since spring 106 is close to center with respect to the mounting point 92. Because of the minimal force generated by spring 106 at this time, there is a minimum frictional force between the depending stud 82 of the target member 84 and the upstanding tab 80 of the common armature 64 at the point designated 108 in the figures. Accordingly, very little frictional force at 108 need be overcome by the electromagnets 46, 48 and 50 such that the antisingle phase device is extremely sensitive and quick.

Assuming that one of the fuses 38, 40 or 42 has blown in FIG. 1 the following events take place. The voltage across the open fuse is impressed upon the corresponding electromagnet, say for example 50 in FIG. 1 and 2. Energization of the electromagnet 50 draws the common armature 64 against the bias of spring 78 into engagement with the core 56 thereof (and at the same time into engagement with the other cores 54 and 52). Movement of the armature 64 from its first to its second position removes the upstanding tab 80 from the path of movement of the depending stud 82 of the target 84 such that under the influence of biasing spring 106 (FIG. 3) the striker 90 is now free to rotate clockwise such that the upstanding wing 104 strikes the tripper bar 32 which, as explained with respect to FIG. 1. initiates contact separation in all phases of the breaker via the contact operating means 22. Simultaneously, the target 84 traveling to the right in FIG. 3 causes the leg 96 of the indicator portion 86 of the target 84 to extend beyond the frame member 72 and provide a visual indication of the operation of the antisingle phase device 44.

It may be appreciated that as the striker 90 begins to rotate clockwise in FIG. 2, the line of action of the spring 106 moves further off center with respect to the mounting point 92 such that there is increased leverage on the striker 90 which increases the torque thereof and assures that there will be sufficient impact generated by the upstanding wing 104 to rotate the tripper bar 32.

As noted previously, if a fault had occurred in two phases of the line, two fuses such as, say for example, 38 and 40 would blow such that two electromagnets 48 and 50 would be energized at approximately the same time. Thus common armature means 64 would experience double the flux and would be drawn toward its attracted position faster to thereby hasten contact separation in the breaker.

To reset the antisingle phase device, the operator manually pushes in the extending portion 96' of the indicator portion 86 of the target, against the bias of the spring 106 until the stud 82 passes over and is latched in place by the upstanding tab 80 of the common armature 64. It will be appreciated that at this time the common armature 64 has reverted, under the influence of spring 78, back to the solid line position in FIG. 2 since the contact pairs 16, 18 and 20 have been opened such that voltage no longer appears across the blown fuse or the parallel connected electromagnets. If for some reason the operator had failed to replace the blown fuse such as 38 in FIG. 1, then the instant the circuit breaker contacts such as 26, 28 and 30 of FIG. 1 are closed into the line, the voltage appearing across the blown fuse such as 42 would appear across the electromagnet 46 and initiate discharge of the contact operating means 22 in the manner previously set forth. Thus, in effect, the breaker contacts cannot be closed in the event that the operator had failed to replace the blown fuse.

Additionally, it may be appreciated that after the antisingle phase device is operated such that the L-shaped portion 96 of the target device is in the position 96' of FIG. 3, a padlock may be secured through the aperture 110 to prevent the striker 90 from ever being rotated back to the solid line position of FIG. 3. In this way the circuit breaker can be locked in its open circuit condition since the tripper bar 32 will be maintained in its tripping position.

Also illustrated in FIG. 3 is a manner in which the device 44 might be utilized in other ways. Thus it is possible for rotation of the striker member 90 (caused by the energization of any one of the electromagnets releasing the latch 80 to permit the spring 106 to rotate the striker) to make or break a contact, illustrated at 112, to thereby perform other functions such as energize a shunt trip, or enable suitable alarm apparatus. Thus rotation of the striker member 90, in the clockwise direction, frees an extending contact arm 114 of the switch 112 (under the influence of an internal biasing spring 116) such that the normally closed circuit 118 will become open. Although not shown, the contact 112 could be normally open and closed in response to the striker member 90 moving off the contact arm 114.

With respect to other applications of the instant invention, as suggested previously, the combination of a plurality of electromagnets, in combination with a cooperating common armature means, in of itself could be utilized to monitor a plurality of conductors without the necessity of utilizing the striker member, target, or spring 106 illustrated in FIGS. 1–3. Thus, the movement of the armature 64 alone, from its normally nonengaged to its engaged position with respect to the electromagnets could be utilized as an output motion to effectuate desired results.

Thus there has been described an antisingle phase device which is simple, inexpensive, and quick-acting, especially in the situation where a fault has been experienced in more than one phase. Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. In combination:
   (A) a circuit breaker including:
   (1) a plurality of pairs of cooperating contacts;
   (2) said pairs of contacts being tripped from a closed circuit to an open circuit condition in response to movement of a trip bar from a first toward a second position;
   (3) a plurality of fuse means;

(4) each of said plurality of fuse means being in electrical series with one of said plurality of pairs of cooperating contacts;

(5) each of said plurality of fuse means normally carrying current therethrough when said current is below a predetermined magnitude, and interrupting current flow therethrough when said current exceeds said predetermined magnitude; and (B) an antisingle phase device including:
(1) a plurality of electromagnets;
(2) each of said plurality of electromagnets being in electrical parallel with one of said plurality of fuse means;
(3) each of said electromagnets becoming energized in response to the interruption of current flow by its respective fuse means such that voltage is applied to said electromagnet;
(4) common armature means mutually cooperating with each of said plurality of electromagnets for movement in response to energization of any one thereof;
(5) said common armature means normally occupying a first position away from said electromagnets when said electromagnets are de-energized;
(6) said common armature means being drawn toward a second position in engagement with said electromagnets in response to energization of any one of said plurality of electromagnets; and
(7) striker means normally held in a first position by said common armature means when said common armature means is in its first position;
(8) said striker means being moved toward a second position in response to movement of said common armature means toward its second position;
(9) movement of said striker means from its first toward its second position moving said trip bar from its first toward its second position;

whereby when current above said predetermined magnitude flows through any of said plurality of fuse means, said fuse means will interrupt to apply voltage to the respective electromagnet in electrical parallel therewith whereby said common armature means will be drawn toward its second position such that said striker means will be moved toward its second position to move said trip bar toward its second position to trip said pairs of cooperating contacts to their open circuit conditions.

2. The combination of claim 1, and further including biasing means for urging said striker means toward its second position.

3. The combination of claim 2, and further including movable target means connected at one end thereof to said striker means, said movable target means being latched by said armature means in a first position to maintain said striker means in its first position when said common armature means is in its first position, energization of any of said electromagnets drawing said common armature means toward its second position to free said target means for travel toward a second position and to permit movement of said striker means toward its second position under the influence of said biasing means.

4. The combination of claim 3, wherein movement of said target means between its first and second position provides a visual indication of the tripping of said pairs of cooperatng contacts in response to interruption of any of said fuse means.

5. The combination of claim 4, wherein said target means includes an indicator portion normally concealed within said anti-single phase device when said target means is in its first position, said indicator portion being moved to an extended visible position exteriorly located with respect to said antisingle phase device when said target means is moved to its second position.

6. The combination of claim 2, wherein said biasing means exerts a minimal force on said striker means when said striker means is held in its first position by said common armature means, and said force on said striker means by said biasing means increases as said striker means moves between its first and second position.

7. The combination of claim 6, wherein said biasing means is a spring and said striker means is mounted on a frame member for pivotal rotation between its first and second position, said spring being extended close to center with respect to the pivotal mounting of said striker means on said frame member when said striker means is held in its first position by said common armature means, rotation of said striker means from its first toward its second position changing the line of force of said spring whereby the force exerted thereby on said striker means increases as said striker means approaches its second position.

8. The combination of claim 1, wherein said common armature means includes a single member of electromagnetizable material normally biased away from said plurality of electromagnets, and wherein the energization of more than one of said electromagnets will attract said common armature means into engagement with said electromagnets quicker than the energization of one of said electromagnets.

9. The combination of claim 1, and further including a supporting member suporting said plurality of electromagnets and defining a portion of the magnetic flux path for each of said plurality of electromagnets.

10. The combination of claim 3, and further including a supporting member supporting said plurality of electromagnets an defining a portion of the magnetic flux path for each of said plurality of electromagnets.

11. A device for monitoring a plurality of conductors and for producing an output motion in response to predetermined conditions occurring in said conductors, said device including:
a plurality of electromagnets;
each of said electromagnets being energized in response to the occurrence of a predetermined condition occurring in one of said conductors;
common armature means mutually cooperating with each of said plurality of electromagnets for movement in response to energization of any one thereof;
said common armature means normally occupying a first position away from said electromagnets when said electromagnets are de-energized;
said common armature means being drawn toward a second position in engagement with said electromagnets to produce said output motion in response to energization of any one of said plurality of electromagnets;
striker means normally held in a first position by said common armature means when said common armature means is in its first position;
said striker means being moved toward a second position in response to movement of said common armature means toward its second position; and
contact means normally occupying a first position when said striker means is in its first position, said contact means being switched to a second position when said striker means moves toward its second position.

12. The device of claim 11, wherein said common armature means includes a single member of electromagnetizable material normally biased away from said plurality of electromagnets, and wherein the energization of more than one of said electromagnets will attract said common armature means into engagement with said electromagnets quicker than the energization of one of said electromagnets.

13. The device of claim 11, and further including a supporting member supporting said plurality of electromagnets, said supporting member including a portion thereof which defines a portion of the magnetic flux path for each of said plurality of electromagnets.

References Cited
UNITED STATES PATENTS

| | | | |
|---|---|---|---|
| 969,809 | 9/1910 | Simon | 335—244 |
| 908,174 | 12/1908 | Vindemore | 335—142 |
| 1,250,302 | 12/1917 | Grandquist | 335—266 |
| 1,799,932 | 4/1931 | Simon | 317—46 |
| 3,031,601 | 4/1962 | Rudolph | 317—46 |
| 3,139,498 | 6/1964 | Linton | 200—121 |
| 3,309,478 | 3/1967 | Kiesel | 317—46 |

BERNARD A. GILHEANY, Primary Examiner

H. BROOME, Assistant Examiner

U.S. Cl. X.R.

317—46